Sept. 18, 1923.  
F. LEWIS ET AL  
VALVE  
Filed Aug. 2, 1920

1,468,506

Inventor  
F. Lewis.  
W. W. Miller.

By Geo. P. Kimmel  
Attorney

Patented Sept. 18, 1923.

1,468,506

UNITED STATES PATENT OFFICE.

FRANCIS LEWIS AND WALTER W. MILLER, OF HERRIN, ILLINOIS.

VALVE.

Application filed August 2, 1920. Serial No. 400,698.

*To all whom it may concern:*

Be it known that we, FRANCIS LEWIS and WALTER W. MILLER, citizens of the United States, residing at Herrin, in the county of Williamson and State of Illinois, have invented certain new and useful Improvements in a Valve, of which the following is a specification.

This invention relates to improvements in valves and has for its object to provide an improved float valve embodying such novel and simplified features of construction as will permit its entire manufacture of wood or similar non-metallic material capable of more effectively resisting the corrosive action of water in mines.

With this and other objects in view, the invention consists in certain novel features of construction as hereinafter shown and described and then specifically pointed out in the claims and in the drawings illustrative of the preferred embodiment of the invention.

Figure 1:
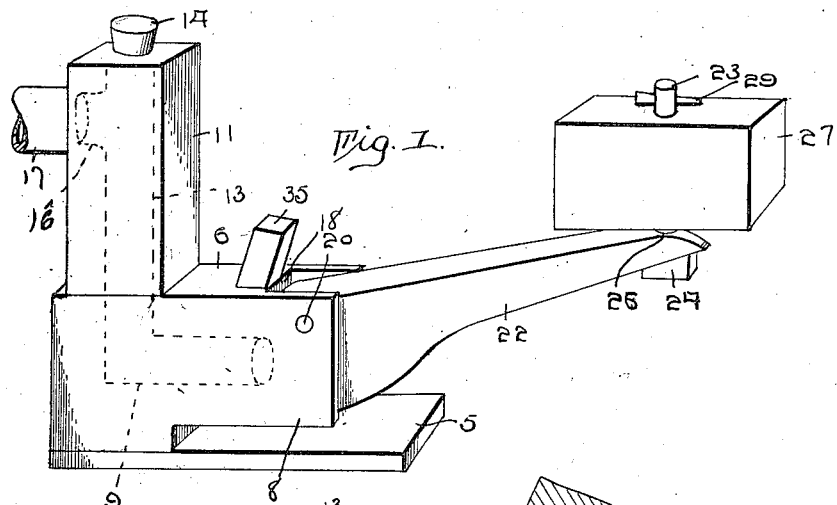
Figure 1 represents a perspective view of the improved valve.
Figure 2:
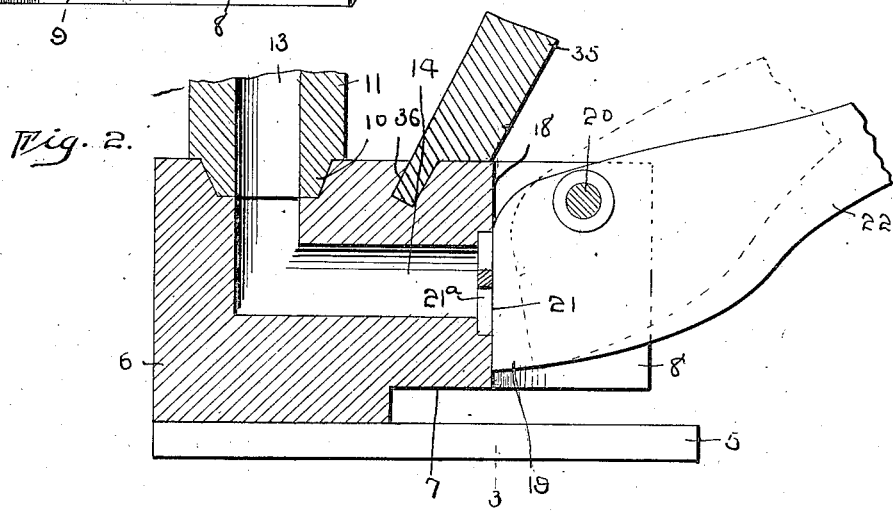
Fig. 2 represents an enlarged fragmental longitudinal sectional view therethrough, and, Fig. 3 represents a transverse sectional view at right-angles to Fig. 2 taken on line 3—3 thereof.
Figure 3:
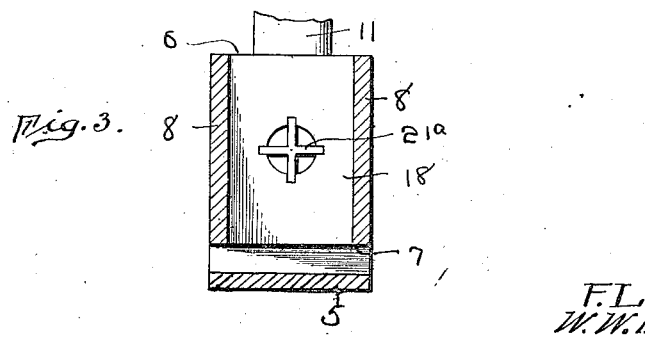

Referring to the drawing in detail, wherein similar reference numerals designate corresponding parts throughout the several views the numeral 5 indicates a base plate supporting the body 6 having an undercut terminal 7 provided with parallel supporting ears 8. The body 6 is provided with an angular passage 9, one of the extremities of which is located between the ears 8 and the other at the top of the body. The terminal of the vertically disposed portion of the passage 9 is enlarged at its upper extremity to provide a seat for the tapered flange 10 of a coupling member 11. A longitudinal passage 13 is formed through the coupling member 11 and is closed at its upper extremity by a plug 14. The flange 10 being tapered upon its external surface is capable of being forcibly driven into the enlarged extremity of the passage 9 to permanently maintain the body and coupling member in assembled relation and the upper extremity of the bore or passage 13 communicates with a lateral extension 16 having connection with a pipe 17 whereby water is conducted from the valve.

The surface 18 at the terminal of the body 6 between the ears 8 constitutes a seat for the valve 19 which latter is pivoted at 20 on a pin extending through the ears 8 and a guard 21ª consisting of a pair of crossed bars is arranged at the inlet terminal of the passage 9 to prevent admission of particles of foreign matter to the body. The flat surface 21 of the valve is so arranged as to close the terminal of the passage 9 and prevent passage of liquid therethrough and an integral extension or arm 22 is formed upon the valve 19 and, when the latter is closed, is disposed at an inclination with relation to the longitudinal axis of the body 6.

A retaining pin 23 having a headed lower extremity 24 is passed through an aperture 26 formed in the outer reduced portion of the arm 22 and through a vertical aperture formed in the float 27. The float is held in position upon the pin by a supplemental pin 29 extending diametrically through an aperture formed in the bolt 23. The bolt or pin 23 is of such length as to loosely connect the float 27 with the arm 22 to afford the float a limited amount of movement with relation to the arm.

Owing to the angular relation of the seat engaging face 21 of the valve and the arm 22, the weight of the latter together with the weight of the float 27 is utilized to maintained the valve in closed position. However, when the valve is submerged in water, the buoyancy of the float 27 automatically opens the valve when the level of the water exceeds a predetermined height.

A stop block 35 carrying a reduced stem 36 fitted in an aperture formed in the body 6 is so arranged as to limit the upward swinging movement of the arm 22 and prevent possibility of the arm moving to a true vertical position and consequently preventing it from becoming balanced and incapable of returning to close the valve.

In many of the mines throughout the world, drainage systems are provided for the purpose of facilitating the mining operations therein, and this is usually accomplished by the provision of a suitable number of pits, commonly termed lodgements or sumps, throughout the shafts, galleries, and haulage entries of the mines, for the accumulation of the mine water therein, and these pits or lodgements are connected up to a power driven pump which is operated when necessary for the discharge of the water from the several pits or lodgements to a point remote from the mine entrance or entrances. In some of these mines, the water present within the same is "bad," or of large mineral or acid content, and will act to quickly destroy metal pipes and valves ordinarily used for withdrawing the water from the same. In consequence of these facts, the present invention contemplates a float valve construction entirely of wood, similarly to the pipe line to which it is to be connected, whereby to be placed within a mine pit or lodgement and be immersed in a small body of the mine water at all times, so that it will not be subjected to drying and rewetting processes, which would tend to lessen its life or otherwise result in its total destruction, the water being held at a predetermined level within each pit or lodgement for the purpose.

In the use of the valve the same is adapted to be immersed or partially immersed in vertical position, in the body of water within a mine pit or sump, and the valve remains normally closed under the combined weight of the valve arm 22 and the float carried at the outer end thereof just as long as the water level is maintained in the plane of or below the under face of the float, and is opened upon a rise of water to a point above the under face of the float or to a sufficient height with respect thereto, when the buoyancy of the float 27 overcomes the effects of its own weight and the weight of the valve arm 22 tending to keep the valve closed. As long as the water level is above a predetermined height, the valve will remain open and the water can be pumped from the pipe outlet 17, and just as soon as the water level is lowered to below said predetermined height, the weight of the valve arm 22 and of the float 27 carried thereby again effects the closing of the valve.

What we claim is:

1. In a mine sump valve, a valve body adapted to be immersed in the water gathering in a sump and having a passage therethrough, a valve seat at the inlet end of the passage, a valve normally closed on said seat by its own weight and retaining the water in which the valve body is immersed below a predetermined level, and a float actuating said valve to open position upon a rise of the water above the said level.

2. In a mine sump valve, a valve body adapted to be immersed in the water gathering in a sump and having a passage therethrough, a valve seat at the inlet end of the passage, a valve lever pivotally connected to the body and having its inner end formed to provide a valve portion normally contacting the valve seat to close the said passage under the action of its own weight, and a float carried at the outer end of said valve lever for actuating the same to open the passage through said body upon a rise of the water above a predetermined level of the same.

3. In a mine sump valve, a valve body adapted to be immersed in the water gathering in a sump and having a passage therethrough, a valve seat at the inlet end of the passage, a valve lever pivotally connected to the body and having its inner end formed to provide a valve portion normally contacting the valve seat to close the said passage under the action of its own weight, a float carried at the outer end of said valve lever for actuating the same to open the passage through said body upon a rise in the water above a predetermined level of the same, and a stop means for limiting the opening movement of said valve lever.

In testimony whereof, we affix our signatures hereto.

FRANCIS LEWIS.
WALTER W. MILLER.